(12) United States Patent
Li et al.

(10) Patent No.: US 12,494,869 B2
(45) Date of Patent: Dec. 9, 2025

(54) BURST TRANSMISSION OF DATA PACKETS WITH FEEDBACK

(71) Applicant: NOKIA TECHNOLOGIES OY, Espoo (FI)

(72) Inventors: Zexian Li, Espoo (FI); Ling Yu, Kauniainen (FI); Vinh Van Phan, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 392 days.

(21) Appl. No.: 18/025,674

(22) PCT Filed: Sep. 10, 2020

(86) PCT No.: PCT/EP2020/075269
§ 371 (c)(1),
(2) Date: Mar. 10, 2023

(87) PCT Pub. No.: WO2022/053138
PCT Pub. Date: Mar. 17, 2022

(65) Prior Publication Data
US 2023/0336277 A1    Oct. 19, 2023

(51) Int. Cl.
*H04L 1/18*    (2023.01)

(52) U.S. Cl.
CPC ..................... *H04L 1/18* (2013.01)

(58) Field of Classification Search
CPC ...... H04L 1/08; H04L 1/18; H04L 2001/0097
See application file for complete search history.

(56) References Cited

U.S. PATENT DOCUMENTS

| 2007/0025304 A1* | 2/2007 | Leelahakriengkrai ..................... H04W 36/02 455/452.2 |
| 2022/0060925 A1* | 2/2022 | Kumar .............. H04W 28/0242 |
| 2024/0098553 A1* | 3/2024 | Mandelli ........... H04W 28/0252 |

OTHER PUBLICATIONS

International Search Report and Written Opinion dated May 27, 2021, corresponding to International Patent Application No. PCT/EP2020/075269.
Spreadtrum Communications, "Enhancements for PDCP duplication", 3GPP TSG-RAN WG2 Meeting #105, Athens, Greece, Feb. 25-Mar. 1, 2019, R2-1900928, 2 pages.
"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

(Continued)

*Primary Examiner* — Mansour Oveissi
(74) *Attorney, Agent, or Firm* — Carter, DeLuca & Farrell LLP

(57) ABSTRACT

Various example embodiments provide efficient burst transmission of duplicated data packets. A data burst comprising multiple data packets may be configured to be transmitted on a first transmission leg. The data burst may be further configured to be transmitted on a second transmission leg with a different order of data packets. A reception status of the data packets may be configured to be determined based on transmissions on the first and second transmission legs and non-acknowledged data packets may be retransmitted on the first transmission leg and/or the second transmission leg. Apparatuses, methods, and computer programs are disclosed.

12 Claims, 8 Drawing Sheets

(56) References Cited

OTHER PUBLICATIONS

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; Packet Data Convergence Protocol (PDCP) specification (Release 16)", 3GPP TS 38.323, V16.0.0, Mar. 2020, pp. 1-37.

"3rd Generation Partnership Project; Technical Specification Group Services and System Aspects; Service requirements for cyber-physical control applications in vertical domains; Stage 1 (Release 17)", 3GPP TS 22.104, V17.2.0, Dec. 2019, pp. 1-76.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V0.3.0, Jan. 2020, pp. 1-33.

"New WID on enhanced Industrial Internet of Things (IoT) and URLLC support", 3GPP TSG RAN Meeting #86, RP-193233, Agenda Item: 9.1.2, Nokia, Dec. 9-12, 2019, 5 pages.

"3rd Generation Partnership Project; Technical Specification Group Radio Access Network; NR; Radio Link Control (RLC) protocol specification (Release 16)", 3GPP TS 38.322, V16.0.0, Mar. 2020, pp. 1-33.

"IEEE 802.11", Wikipedia, Retrieved on May 24, 2024, Webpage available at : https://en.wikipedia.org/wiki/IEEE_802.11.

Notice of Allowance received for corresponding European Patent Application No. 20771276.1, dated Apr. 26, 2024, 8 pages.

\* cited by examiner

BURST TRANSMISSION OF DATA PACKETS WITH FEEDBACK

TECHNICAL FIELD

Various example embodiments generally relate to the field of data communications. In particular, some example embodiments relate to burst transmission of data packets in a cellular communication network.

BACKGROUND

In various wireless communication technologies, such as 3GPP long-term evolution (LTE) 4G and 5G new radio (NR), a client node such as a user equipment (UE) may communicate with one or more network nodes over wireless radio channels. To improve reliability of data communication, the UE may be connected to two network nodes, for example a master node (MN) and a secondary node (SN) and divide or duplicate the transmission over these separate transmission legs. It is further possible to communicate with a sidelink UE over two different transmission legs. Data communication may be based on a protocol stack comprising various communication protocols and layers such as for example a packet data convergence protocol (PDCP) layer, a radio link control (RLC) layer, a medium access control (MAC) layer, and a physical layer.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide an efficient solution for burst transmission of duplicated data packets. This benefit may be achieved by the features of the independent claims. Further implementation forms are provided in the dependent claims, the description, and the drawings.

According to a first aspect, an apparatus may comprise at least one processor and at least one memory including computer program code, the at least one memory and the computer code configured to, with the at least one processor, cause the apparatus at least to: obtain a data burst for transmission, the data burst comprising a plurality of data packets; transmit at least a first subset of the plurality of data packets on a first transmission leg; cause transmission of at least a second subset of the plurality of data packets on a second transmission leg, wherein a transmission order of the plurality of data packets is different for the first transmission leg and the second transmission leg; and receive at least one burst reception indication indicative of acknowledgment and/or non-acknowledgement of at least one of the plurality of data packets.

According to an example embodiment of the first aspect, the at least one memory and the computer code may be further configured to, with the at least one processor, cause the apparatus to: cause retransmission of at least one non-acknowledged data packet of the plurality of data packets on the first transmission leg and/or the second transmission leg; or cause termination of transmission of at least one acknowledged data packet of the plurality of data packets.

According to an example embodiment of the first aspect, the retransmission of the at least one non-acknowledged data packet of the plurality of data packets may comprise continuing transmission of a duplication of the at least one non-acknowledged data packet on at least one of the first transmission leg and the second transmission leg.

According to an example embodiment of the first aspect, the termination of the transmission of the at least one acknowledged data packet may comprise terminating transmission of a duplication of the at least one acknowledged data packet on the first transmission leg or the second transmission leg.

According to an example embodiment of the first aspect, the at least one memory and the computer code may be further configured to, with the at least one processor, cause the apparatus to: obtain the data burst for transmission at an upper layer of a protocol stack; provide the plurality of data packets to a first instance of a lower layer of the protocol stack for transmission on the first transmission leg; and re-order the plurality of data packets and provide the re-ordered plurality of data packets to a second instance of the lower layer of the protocol stack for transmission on the second transmission leg.

According to an example embodiment of the first aspect, the at least one memory and the computer code may be further configured to, with the at least one processor, cause the apparatus to: receive the burst reception indication at the upper layer of the protocol stack; and determine, at the upper layer of the protocol stack, to retransmit the at least one non-acknowledged data packet on the first transmission leg and/or the second transmission leg, or determine, at the upper layer of the protocol stack, not to retransmit the at least one acknowledged data packet.

According to an example embodiment of the first aspect, the at least one memory and the computer code may be further configured to, with the at least one processor, cause the apparatus to: transmit burst context information at the upper layer of the protocol stack.

According to an example embodiment of the first aspect, the at least one memory and the computer code may be further configured to, with the at least one processor, cause the apparatus to: obtain the data burst for transmission at an upper layer of a protocol stack; provide the plurality of data packets to a first instance of a lower layer of the protocol stack for transmission on the first transmission leg; instruct a second instance of the lower layer of the protocol stack to re-order the plurality of data packets; and provide the plurality of data packets to the second instance of the lower layer of the protocol stack for transmission on the second transmission leg.

According to an example embodiment of the first aspect, the at least one memory and the computer code may be further configured to, with the at least one processor, cause the apparatus to: receive the burst reception indication at the first instance of the lower layer of the protocol stack and determine, at the first instance of the lower layer of the protocol stack, to retransmit the at least one non-acknowledged data packet on the first transmission leg; and/or receive the burst reception indication at the second instance of the lower layer of the protocol stack and determine, at the second instance of the lower layer of the protocol stack, to retransmit the at least one non-acknowledged data packet on the second transmission leg.

According to an example embodiment of the first aspect, the at least one memory and the computer code may be further configured to, with the at least one processor, cause the apparatus to: transmit burst context information at the lower layer of the protocol stack.

According to an example embodiment of the first aspect, the burst context information may comprise at least one of:

a mapping between a burst identifier of the data burst and at least one transport block of the lower layer of the protocol stack, or a mapping between a packet identifier of at least one of the plurality of data packets and the at least one transport block of the lower layer of the protocol stack.

According to an example embodiment of the first aspect, the burst context information may comprise at least one of: an indication of a number of the plurality of data packets in the data burst, an indication of a sequence number of at least one of the plurality of data packets in the data burst, a burst arrival time, or a packet delay budget.

According to an example embodiment of the first aspect, the upper layer of the protocol stack may comprise a packet data convergence protocol layer. The lower layer of the protocol stack may comprise a medium access control layer or a radio link control layer.

According to an example embodiment of the first aspect, the at least one memory and the computer code may be further configured to, with the at least one processor, cause the apparatus to: transmit the burst context information in at least one of: a control element of the medium access control layer, control signaling of the packet data convergence protocol, radio resource control signaling, physical layer signaling, or sidelink control information.

According to an example embodiment of the first aspect, the at least one memory and the computer code may be further configured to, with the at least one processor, cause the apparatus to: cause transmission of the plurality of data packets on the second transmission leg in a reverse order compared to the first transmission leg.

According to an example embodiment of the first aspect, the at least one memory and the computer code may be further configured to, with the at least one processor, cause the apparatus to: transmit the first subset of the plurality of data packets in a first transmission on the first transmission leg; cause transmission of the second subset of the plurality of data packets in a first transmission on the second transmission leg; transmit the second subset of the plurality of data packets in a second transmission on the first transmission leg; and cause transmission of the first subset of the plurality of data packets in a second transmission on the second transmission leg.

According to an example embodiment of the first aspect, the apparatus may comprise a master node configured to: transmit the first subset of the plurality of data packets; and instruct a secondary node to transmit the second subset of the plurality of data packets.

According to an example embodiment of the first aspect, the master node may be further configured to: instruct the secondary node to transmit the plurality of data packets in the different order.

According to an example embodiment of the first aspect, the apparatus may comprise a client node configured to: transmit the first subset of the plurality of data packets on a first sidelink carrier; and transmit the second subset of the plurality of data packets on a second sidelink carrier.

According to a second aspect, a method may comprise: obtaining a data burst for transmission, the data burst comprising a plurality of data packets; transmitting at least a first subset of the plurality of data packets on a first transmission leg; causing transmission of at least a second subset of the plurality of data packets on a second transmission leg, wherein a transmission order of the plurality of data packets is different for the first transmission leg and the second transmission leg; and receiving at least one burst reception indication indicative of acknowledgment and/or non-acknowledgement of at least one of the plurality of data packets.

According to an example embodiment of the second aspect, the method may further comprise: causing retransmission of at least one non-acknowledged data packet of the plurality of data packets on the first transmission leg and/or the second transmission leg; or causing termination of transmission of at least one acknowledged data packet of the plurality of data packets.

According to an example embodiment of the second aspect, the retransmission of the at least one non-acknowledged data packet of the plurality of data packets may comprise continuing transmission of a duplication of the at least one non-acknowledged data packet on at least one of the first transmission leg and the second transmission leg.

According to an example embodiment of the second aspect, the termination of the transmission of the at least one acknowledged data packet may comprise terminating transmission of a duplication of the at least one acknowledged data packet on the first transmission leg or the second transmission leg.

According to an example embodiment of the second aspect, the method may further comprise: obtaining the data burst for transmission at an upper layer of a protocol stack; providing the plurality of data packets to a first instance of a lower layer of the protocol stack for transmission on the first transmission leg; and re-ordering the plurality of data packets and providing the re-ordered plurality of data packets to a second instance of the lower layer of the protocol stack for transmission on the second transmission leg.

According to an example embodiment of the second aspect, the method may further comprise: receiving the burst reception indication at the upper layer of the protocol stack; and determining, at the upper layer of the protocol stack, to retransmit the at least one non-acknowledged data packet on the first transmission leg and/or the second transmission leg, or determining, at the upper layer of the protocol stack, not to retransmit the at least one acknowledged data packet.

According to an example embodiment of the second aspect, the method may further comprise: transmitting burst context information at the upper layer of the protocol stack.

According to an example embodiment of the second aspect, the method may further comprise: obtaining the data burst for transmission at an upper layer of a protocol stack; providing the plurality of data packets to a first instance of a lower layer of the protocol stack for transmission on the first transmission leg; instructing a second instance of the lower layer of the protocol stack to re-order the plurality of data packets; and providing the plurality of data packets to the second instance of the lower layer of the protocol stack for transmission on the second transmission leg.

According to an example embodiment of the second aspect, the method may further comprise: receiving the burst reception indication at the first instance of the lower layer of the protocol stack and determining, at the first instance of the lower layer of the protocol stack, to retransmit the at least one non-acknowledged data packet on the first transmission leg; and/or receiving the burst reception indication at the second instance of the lower layer of the protocol stack and determining, at the second instance of the lower layer of the protocol stack, to retransmit the at least one non-acknowledged data packet on the second transmission leg.

According to an example embodiment of the second aspect, the method may further comprise: transmitting burst context information at the lower layer of the protocol stack.

According to an example embodiment of the second aspect, the burst context information may comprise at least one of: a mapping between a burst identifier of the data burst and at least one transport block of the lower layer of the protocol stack, or a mapping between a packet identifier of at least one of the plurality of data packets and the at least one transport block of the lower layer of the protocol stack.

According to an example embodiment of the second aspect, the burst context information may comprise at least one of: an indication of a number of the plurality of data packets in the data burst, an indication of a sequence number of at least one of the plurality of data packets in the data burst, a burst arrival time, or a packet delay budget.

According to an example embodiment of the second aspect, the upper layer of the protocol stack may comprise a packet data convergence protocol layer. The lower layer of the protocol stack may comprise a medium access control layer or a radio link control layer.

According to an example embodiment of the second aspect, the method may further comprise: transmitting the burst context information in at least one of: a control element of the medium access control layer, control signaling of the packet data convergence protocol, radio resource control signaling, physical layer signaling, or sidelink control information.

According to an example embodiment of the second aspect, the method may further comprise: causing transmission of the plurality of data packets on the second transmission leg in a reverse order compared to the first transmission leg.

According to an example embodiment of the second aspect, the method may further comprise: transmitting the first subset of the plurality of data packets in a first transmission on the first transmission leg; causing transmission of the second subset of the plurality of data packets in a first transmission on the second transmission leg; transmitting the second subset of the plurality of data packets in a second transmission on the first transmission leg; and causing transmission of the first subset of the plurality of data packets in a second transmission on the second transmission leg.

According to an example embodiment of the second aspect, the method may further comprise: transmitting, by a master node, the first subset of the plurality of data packets; and instructing, by the master node, a secondary node to transmit the second subset of the plurality of data packets.

According to an example embodiment of the second aspect, the method may further comprise instructing, by the master node, the secondary node to transmit the plurality of data packets in the different order.

According to an example embodiment of the second aspect, the method may further comprise: transmitting, by a client node, the first subset of the plurality of data packets on a first sidelink carrier; and transmitting, by the client node, the second subset of the plurality of data packets on a second sidelink carrier.

According to a third aspect, a computer program may comprise instructions for causing an apparatus to perform at least the following: obtaining a data burst for transmission, the data burst comprising a plurality of data packets; transmitting at least a first subset of the plurality of data packets on a first transmission leg; causing transmission of at least a second subset of the plurality of data packets on a second transmission leg, wherein a transmission order of the plurality of data packets is different for the first transmission leg and the second transmission leg; and receiving at least one burst reception indication indicative of acknowledgment and/or non-acknowledgement of at least one of the plurality of data packets. The computer program may further comprise instructions for causing the apparatus to perform any example embodiment of the method of the second aspect.

According to a fourth aspect, an apparatus may comprise means for obtaining a data burst for transmission, the data burst comprising a plurality of data packets; means for transmitting at least a first subset of the plurality of data packets on a first transmission leg; means for causing transmission of at least a second subset of the plurality of data packets on a second transmission leg, wherein a transmission order of the plurality of data packets is different for the first transmission leg and the second transmission leg; and means for receiving at least one burst reception indication indicative of acknowledgment and/or non-acknowledgement of at least one of the plurality of data packets. The apparatus may further comprise means for performing any example embodiment of the method of the second aspect.

According to a fifth aspect, an apparatus may comprise at least one processor and at least one memory including computer program code, the at least one memory and the computer code configured to, with the at least one processor, cause the apparatus at least to: receive at least a first subset of a plurality of data packets of a data burst over a first transmission leg; determine a burst reception indication for the data burst based on at least the first subset of the plurality of data packets and a reception status of at least a second subset of the plurality of data packets associated with a second transmission leg, wherein a transmission order of the plurality of data packets is different for the first transmission leg and the second transmission leg, and wherein the burst reception indication is indicative of acknowledgment and/or non-acknowledgement of at least one of the plurality of data packets; and cause transmission of the burst reception indication on the first transmission leg and/or the second transmission leg.

According to an example embodiment of the fifth aspect, the at least one memory and the computer code may be further configured to, with the at least one processor, cause the apparatus to: receive the first subset of data packets and the second subset of data packets at an upper layer of a protocol stack; determine the burst reception indication based on the first subset of the plurality of data packets and the second subset of the plurality of data packets; and transmit the burst reception indication at the upper protocol layer of the protocol stack.

According to an example embodiment of the fifth aspect, the at least one memory and the computer code may be further configured to, with the at least one processor, cause the apparatus to: receive burst context information at the upper layer of the protocol stack.

According to an example embodiment of the fifth aspect, the at least one memory and the computer code may be further configured to, with the at least one processor, cause the apparatus to: receive the first subset of data packets at a first instance of a lower layer of a protocol stack; receive the reception status of at least the second subset of the plurality of data packets from a second instance of the lower layer of the protocol stack; and transmit the burst reception indication at the lower layer of the protocol stack.

According to an example embodiment of the fifth aspect, the at least one memory and the computer code may be further configured to, with the at least one processor, cause the apparatus to: receive burst context information at the first instance of the lower layer of the protocol stack.

According to an example embodiment of the fifth aspect, the burst context information may comprise at least one of:

a mapping between a burst identifier of the data burst and at least one transport block of the lower layer of the protocol stack, or a mapping between a packet identifier of at least one of the plurality of data packets and the at least one transport block of the lower layer of the protocol stack.

According to an example embodiment of the fifth aspect, the burst context information may comprise at least one of: an indication of a number of the plurality of data packets in the data burst, an indication of a sequence number of at least one of the plurality of data packets in the data burst, a burst arrival time, or a packet delay budget.

According to an example embodiment of the fifth aspect, the upper layer of the protocol stack may comprise a packet data convergence protocol layer. The lower layer of the protocol stack may comprise a medium access control layer or a radio link control layer.

According to an example embodiment of the fifth aspect, the at least one memory and the computer code may be further configured to, with the at least one processor, cause the apparatus to: receive the burst context information in at least one of: a control element of the medium access control layer, control signaling of the packet data convergence protocol, radio resource control signaling, physical layer signaling, or sidelink control information.

According to an example embodiment of the fifth aspect, the at least one memory and the computer code may be further configured to, with the at least one processor, cause the apparatus to: receive the first subset of the plurality of data packets in a first transmission over the first transmission leg; and receive the second subset of the plurality of data packets in a second transmission over the first transmission leg, wherein the second subset of the plurality of data packets is received in a first transmission over the second transmission leg and wherein the first subset of the plurality of data packets is received in a second transmission over the second transmission leg.

According to an example embodiment of the fifth aspect, the at least one memory and the computer code may be further configured to, with the at least one processor, cause the apparatus to: receive the plurality of data packets over the first transmission leg in a reverse order compared to the transmission order of the plurality of data packets for the second transmission leg.

According to an example embodiment of the fifth aspect, the at least one memory and the computer code may be further configured to, with the at least one processor, cause the apparatus to: receive the first subset of data packets; and receive the reception status of at least the second subset of data packets from a secondary node.

According to an example embodiment of the fifth aspect, the apparatus may comprise a client node configured to: receive the first subset of data packets on a first sidelink carrier; and receive the second subset of data packets on a second sidelink carrier.

According to a sixth aspect, a method may comprise: receiving at least a first subset of a plurality of data packets of a data burst over a first transmission leg; determining a burst reception indication for the data burst based on at least the first subset of the plurality of data packets and a reception status of at least a second subset of the plurality of data packets associated with a second transmission leg, wherein a transmission order of the plurality of data packets is different for the first transmission leg and the second transmission leg, and wherein the burst reception indication is indicative of acknowledgment and/or non-acknowledgement of at least one of the plurality of data packets; and causing transmission of the burst reception indication on the first transmission leg and/or the second transmission leg.

According to an example embodiment of the sixth aspect, the method may further comprise: receiving the first subset of data packets and the second subset of data packets at an upper layer of a protocol stack; determining the burst reception indication based on the first subset of the plurality of data packets and the second subset of the plurality of data packets; and transmitting the burst reception indication at the upper protocol layer of the protocol stack.

According to an example embodiment of the sixth aspect, the method may further comprise: receiving burst context information at the upper layer of the protocol stack.

According to an example embodiment of the sixth aspect, the method may further comprise: receiving the first subset of data packets at a first instance of a lower layer of a protocol stack; receiving the reception status of at least the second subset of the plurality of data packets from a second instance of the lower layer of the protocol stack; and transmitting the burst reception indication at the lower layer of the protocol stack.

According to an example embodiment of the sixth aspect, the method may further comprise: receiving burst context information at the first instance of the lower layer of the protocol stack.

According to an example embodiment of the sixth aspect, the burst context information may comprise at least one of: a mapping between a burst identifier of the data burst and at least one transport block of the lower layer of the protocol stack, or a mapping between a packet identifier of at least one of the plurality of data packets and the at least one transport block of the lower layer of the protocol stack.

According to an example embodiment of the sixth aspect, the burst context information may comprise at least one of: an indication of a number of the plurality of data packets in the data burst, an indication of a sequence number of at least one of the plurality of data packets in the data burst, a burst arrival time, or a packet delay budget.

According to an example embodiment of the sixth aspect, the upper layer of the protocol stack may comprise a packet data convergence protocol layer. The lower layer of the protocol stack may comprise a medium access control layer or a radio link control layer.

According to an example embodiment of the sixth aspect, the method may further comprise: receiving the burst context information in at least one of: a control element of the medium access control layer, control signaling of the packet data convergence protocol, radio resource control signaling, physical layer signaling, or sidelink control information.

According to an example embodiment of the sixth aspect, the method may further comprise: receiving the first subset of the plurality of data packets in a first transmission over the first transmission leg; and receiving the second subset of the plurality of data packets in a second transmission over the first transmission leg, wherein the second subset of the plurality of data packets is received in a first transmission over the second transmission leg and wherein the first subset of the plurality of data packets is received in a second transmission over the second transmission leg.

According to an example embodiment of the sixth aspect, the method may further comprise: receiving the plurality of data packets over the first transmission leg in a reverse order compared to the transmission order of the plurality of data packets for the second transmission leg.

According to an example embodiment of the sixth aspect, the method may further comprise: receiving, by a master node, the first subset of data packets; and receiving, by the master node, the reception status of at least the second subset of data packets from a secondary node.

According to an example embodiment of the sixth aspect, the method may further comprise: receiving, by a client node, the first subset of data packets on a first sidelink carrier; and receiving, by the client node, the second subset of data packets on a second sidelink carrier According to a seventh aspect, a computer program may comprise instructions for causing an apparatus to perform at least the following: receiving at least a first subset of a plurality of data packets of a data burst over a first transmission leg; determining a burst reception indication for the data burst based on at least the first subset of the plurality of data packets and a reception status of at least a second subset of the plurality of data packets associated with a second transmission leg, wherein a transmission order of the plurality of data packets is different for the first transmission leg and the second transmission leg, and wherein the burst reception indication is indicative of acknowledgment and/or non-acknowledgement of at least one of the plurality of data packets; and causing transmission of the burst reception indication on the first transmission leg and/or the second transmission leg. The computer program may further comprise instructions for causing the apparatus to perform any example embodiment of the method of the sixth aspect.

According to an eighth aspect, an apparatus may comprise means for receiving at least a first subset of a plurality of data packets of a data burst over a first transmission leg; means for determining a burst reception indication for the data burst based on at least the first subset of the plurality of data packets and a reception status of at least a second subset of the plurality of data packets associated with a second transmission leg, wherein a transmission order of the plurality of data packets is different for the first transmission leg and the second transmission leg, and wherein the burst reception indication is indicative of acknowledgment and/or non-acknowledgement of at least one of the plurality of data packets; and means for causing transmission of the burst reception indication on the first transmission leg and/or the second transmission leg. The apparatus may further comprise means for performing any example embodiment of the method of the sixth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
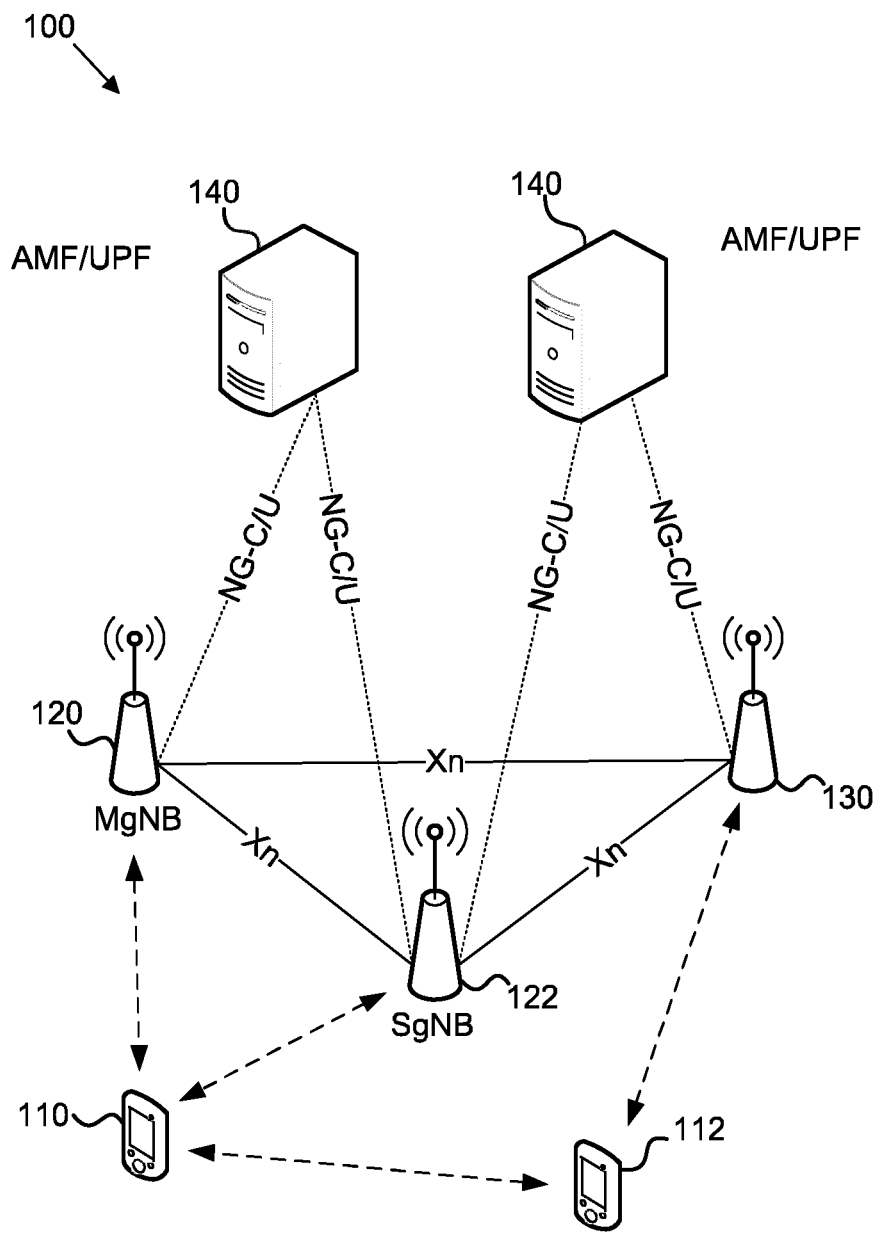
FIG. 1 illustrates an example of a communication network comprising network nodes and client nodes, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In addition to traditional telecommunications, communication systems such as the 5G system (5GS) may support various new applications or services from different vertical domains such as factory automation, building automation, autonomous driving, audio/video production, XR technologies such as augmented reality (AR), virtual reality (VR), mixed reality (MR), or the like. Ultra-reliable low-latency communications (URLLC) and time sensitive communications (TSC) may be applied to support the stringent requirements from both existing and emerging applications. These scenarios and related URLLC communications may be supported for example over the Uu interface between a user equipment (UE) and a base station (BS) or a sidelink (SL) interface between UEs.

Therefore, it is desired to consider system aspects for supporting URLLC and TSC taking into account the existing and new traffic types coming from the different vertical use cases. One possibility is to apply TSC assistance information, as described in the following table:

| Assistance information | Description |
| --- | --- |
| Flow direction | Direction of TSC flow (e.g. uplink or downlink) |
| Periodicity | Time period between start of two bursts |
| Burst arrival time | Arrival time of data burst at either the ingress of the radio access network (RAN) (downlink flow direction) or egress interface of the UE (uplink flow direction) |

In addition, in order to provide efficient support of TSC, new QoS parameters such as for example survival time, burst spread, or the like, may be defined. The new parameters may be defined such that they are applicable in at least the following scenarios:

One burst to 5GS may comprise one packet or multiple packets, for example depending on the size of an application message;

5GS may be aware of the application message attributes (for example, whether there are one or multiple packets in one burst for one application message, the survival time, and/or the burst size) if such information is provided by the application to 5GS;

Loss of one packet within one burst may be regarded as failure of the whole burst, even if there were multiple packets in one burst; and/or Inter-arrival time within one burst may be considered negligible.

One approach for improving reliability of data communication is to apply PDCP duplication, where the same PDCP PDU (packet data unit) may be duplicated to multiple transmission legs, for example RLC legs. In burst based transmission it is in general possible to handle different data packets within the same burst independently. However, this may not be optimal for every application. For example, in case of PDCP duplication, the data packets from the same burst may be duplicated on one or multiple additional legs without any consideration of the dependency among the data packets. Blindly duplicating the data packets in the same burst to the different RLC legs may improve reliability, but the efficiency of such approach may be still further improved. Moreover, some applications could benefit from burst based operations, such as for example signaling how to deliver burst related information to low layers, such as the RLC layer or the MAC layer. Hence, the example embodiments described herein enable to efficiently support burst based operations, for example delivery of burst context, PDCP duplication of packets from the same burst, and related feedback from the receiver to the transmitter.

According to an example embodiment, a data burst comprising multiple data packets may be configured to be transmitted on a first transmission leg. The data burst may be further configured to be transmitted on a second transmission leg with a different order of data packets. A reception status of the data packets may be configured to be determined based on transmissions on the first and second transmission legs and non-acknowledged data packets may be retransmitted on the first transmission leg and/or the second transmission leg.

FIG. 1 illustrates an example of a communication network comprising network nodes and client nodes, according to an example embodiment. The communication network 100 may comprise one or more core network elements such as for example access and mobility management function (AMF) and/or user Plane function (UPF) 140, one or more base stations, represented by a master gNB (MgNB) 120, a secondary gNB (SgNB) 122. The master gNB 120 may be also called a master node (MN). The secondary gNB 122 may be also called a secondary node (SN). The communication network 100 may further comprise other base stations such as gNB 130. The communication network 100 may further comprise one or more client nodes, which may be also referred to as a user nodes or user equipment (UE). For example, the network may comprise a UE 110 and a sidelink UE 112. UEs 110, 112 may communicate with one or more of the base stations via wireless radio channel(s). Furthermore, the UE 110 may communicate with (or via) the sidelink UE 112 over a sidelink connection, which may be a direct radio connection between the UE 110 and sidelink UE 112. Communications between UE 110, MgNB 120, SgNB 122, and sidelink UE 112 may be bidirectional. Hence, any of the devices may be configured to operate as a transmitter and/or a receiver.

The base stations may be configured to communicate with the core network elements over a communication interface, such as for example a control plane interface or a user plane interface NG-C/U. Base stations may be also called radio access network (RAN) nodes and they may be part of a radio access network between the core network and the UEs. Functionality of a base station may be distributed between a central unit (CU), for example a gNB-CU, and one or more distributed units (DU), for example gNB-DUs. Network elements AMF/UPF, gNB, gNB-CU, and gNB-DU may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

The communication network 100 may be configured for example in accordance with the 5th Generation digital cellular communication network, as defined by the 3rd Generation Partnership Project (3GPP). In one example, the communication network 100 may operate according to 3GPP 5G-NR (5G New Radio). It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

In a split architecture scenario, central unit of a base station may comprise a physical or logical node and may include functions such as for example transfer of user data, mobility control, radio access network sharing, positioning, session management, or the like, except for functions that may be allocated to the distributed unit(s). The central unit may be connected to the one or more distributed units over a communication interface, for example an F1 interface. The one or more distributed units may be physical or logical nodes that may be configured to provide a subset of base station functions, depending on how the functions are split between the central unit and the distributed unit(s). The distributed unit(s) may be controlled by the central unit through the communication interface. A base station may be connected to other radio access network nodes by another communication interface, for example an Xn interface. It is appreciated that network functionality described herein may be implemented at a gNB, or divided between a gNB-CU and a gNB-DU.

Figure 2:
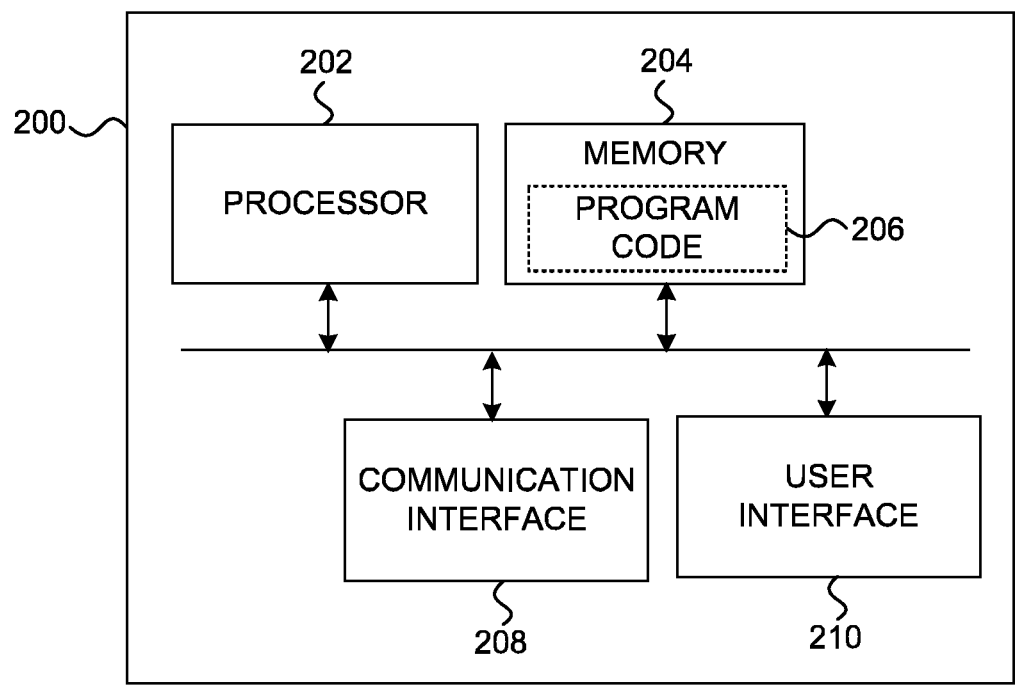
FIG. 2 illustrates an example of an apparatus configured to practice one or more example embodiments.

FIG. 2 illustrates an example embodiment of an apparatus 200, for example a client node such as for example UE 110, sidelink UE 112, or a network node such as for example MgNB 120, SgNB 122, or gNB 130. The apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the at least one memory 204, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 200 comprises means for performing at least one method described herein. In one example, the means comprises the at least one processor 202, the at least one memory 204 including program code 206 configured to, when executed by the at least one processor, cause the apparatus 200 to perform the method.

The apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figure 3:
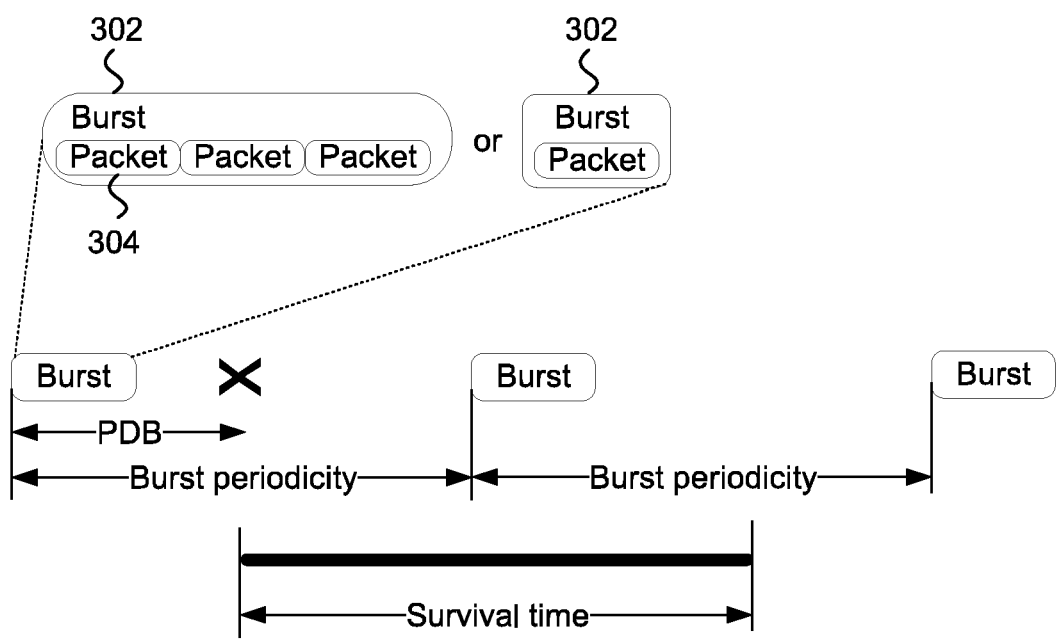
FIG. 3 illustrates an example of burst transmission of data packets, according to an example embodiment.

FIG. 3 illustrates an example of burst transmission of data packets, according to an example embodiment. A transmitter may obtain a data burst 302 for transmission. For example, the transmitter may receive the data from an application running on the transmitter device. The data burst 302 may comprise a plurality of data packets 304 or a single data packet. A set of bursts may be transmitted according to burst periodicity, which may be a parameter indicating the time period between consecutive bursts, for example the start of consecutive bursts. A packet delay budget (PDB) may comprise an upper bound for an acceptable delay for a data packet 304. A survival time may refer to a time that an application consuming a communication service may continue without an anticipated message. The survival time period may begin after the packet delay budget has been consumed without receiving the anticipated message.

Figure 4:
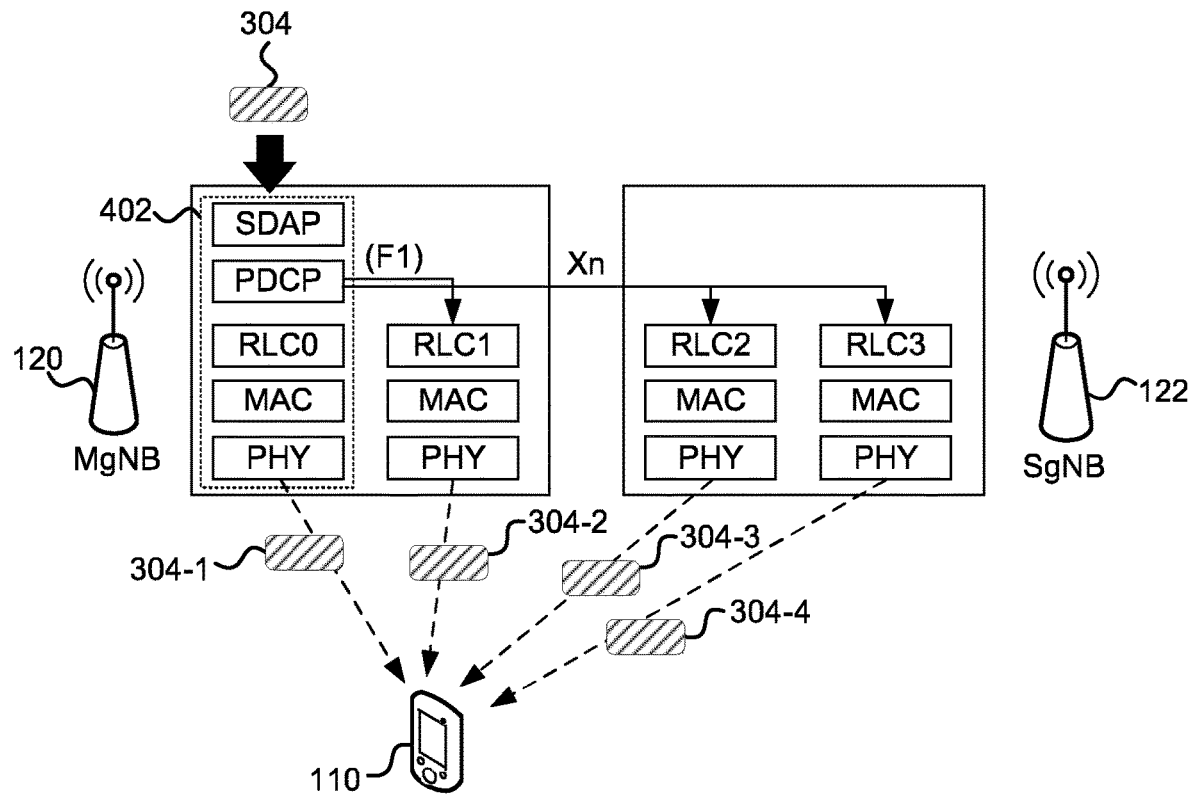
FIG. 4 illustrates an example of PDCP duplication with four RLC transmission legs associated with two network nodes, according to an example embodiment.

FIG. 4 illustrates an example of PDCP duplication with four RLC transmission legs associated with two network nodes, according to an example embodiment. URLLC may be considered as one usage scenario for cellular communication and therefore technical enablers may be specified for such use case. PDCP duplication enables to improve transmission reliability by duplicating the same PDCP PDU over multiple RLC legs. An RLC leg is an example of a transmission leg. A transmission leg may refer to a physically and/or logically separate transmission path or transmission channel. For example, different transmission legs may be provided by duplicating upper layer data packets to multiple instances of a lower layer protocol. Different transmission legs may be provided between different devices, for example between UE 110 and MgNB 120 and UE 110 and SgNB 122. Alternatively, separate transmission legs may be provided between two devices, but with physically separate transmission resources such as for example frequency or time resources, for example between UE 110 and sidelink UE 112.

A transmitter, represented in this example by MgNB 120, may comprise a protocol stack 402 comprising a plurality of protocol layers, for example based on the open systems interconnection (OSI) model or layer model of a particular standard. In one example, the protocol stack 402 may comprise a service data adaptation protocol (SDAP) layer, which may receive data from an application layer for transmission, for example data packet 304. The SDAP layer may be configured to exchange data with the PDCP layer. The PDCP layer may be responsible of generation of data bursts comprising one or more data packets, for example based on data obtained from the SDAP layer.

The PDCP layer may provide data to one or more instances of the RLC layer. For example, the PDCP data packet may be duplicated on a plurality of RLC transmission legs. In the example of FIG. 4 there are four RLC instances providing four RLC transmission legs (PDCP duplication paths). One or more of the additional RLC instances may be co-located within the MgNB 120. In this case the PDCP data may be provided to the additional RLC instance, for example RLC1, over the F1 interface. However, one of more of the additional RLC instances may be located at another transmitter, represented by SgNB 122. In this case the PDCP data may be provided to the further RLC instance(s), for example RLC2 and RLC3, over the Xn interface. Each RLC instance may be associated with corresponding MAC instances of the MAC layer. RLC and MAC instances may be also called RLC and MAC entities, respectively. A corresponding protocol stack may be applied at a receiver, for example UE 110.

The MAC layer may provide a mapping between logical channels of upper layer(s) and transport channels of the physical layer, handle multiplexing and demultiplexing of MAC service data units (SDU). Furthermore, the MAC layer may provide error correction functionality based on packet retransmissions, for example according to the hybrid automatic repeat request (HARQ) process. Physically separate transmission legs may be provided by the physical (PHY) layer. The UE 110 may receive four instances (304-1, 304-2, 304-3, 304-4) of the data packet 304. In various example embodiments described herein, the PDCP layer is used as an example of an upper layer of the protocol stack 402. The MAC or RLC layer is used as an example of a lower layer of the protocol stack 402. It is however appreciated that similar functionality may be implemented at other layers of the protocol stack 402, or any other suitable protocol stack.

Figure 5:
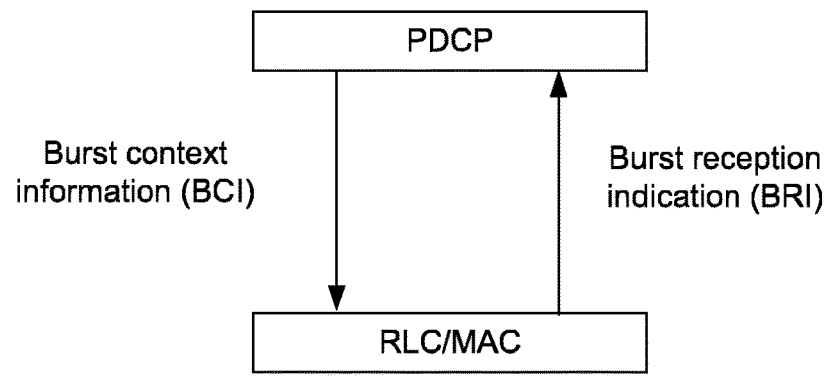
FIG. 5 illustrates an example of information exchange between PDCP layer and RLC and/or MAC layer, according to an example embodiment.

FIG. 5 illustrates an example of information exchange between PDCP layer and RLC and/or MAC layer, according to an example embodiment. Example embodiments enable efficient transmission of large bursts comprising multiple data packets, for example in the case of PDCP duplication. To support such burst based functionality, burst related signaling information may be exchanged between upper and lower layers of the protocol stack 402, for example between the PDCP and RLC/MAC layers. The RLC layer may be seen as an intermediate layer between the PDCP (upper) layer that provides the signaling information to the MAC (lower) layer. However, in some example embodiments the RLC layer may be considered as the lower layer. It is also understood that example embodiments may be applied with multiple intermediate layers or without any intermediate layers between the upper layer and the lower layer.

The PDCP layer may obtain burst context information (BCI), from application server for example based on application layer information or from other network nodes. The burst context information, or a portion thereof, may be provided to lower layer(s) of the protocol stack 402. The burst context information may comprise one or more parameters characterizing a data burst. For example, the burst context information may comprise a mapping between a burst identifier of the data burst and at least one transport block of the MAC layer. This information enables a receiver to detect transport blocks carrying data packets of a particular data burst. The burst information may comprise a mapping between a packet identifier of at least one data packet of the data burst and at least one transport block of the MAC layer. This information enables a receiver to detect transport blocks carrying a particular data packet.

The burst context information may comprise an indication of a number of data packets in the data burst. This enables a receiver for example to determine whether all data packets of the data burst have been received. The burst context information may further comprise an indication of a sequence number of at least one of the data packets in the data burst. The burst context information may further comprise the burst arrival time and the packet delay budget (PDB).

As discussed above, the PDCP layer may provide the burst context information to the RLC/MAC layer, or multiple instances thereof, for example over the F1 or Xn interface. Alternatively, the burst context information may be transmitted to a receiver at the PDCP layer. In one example the burst context information may be transmitted in control signaling of the PDCP layer, for example a PDCP C-PDU (control PDU).

The PDCP layer may receive a burst reception indication (BRI). The burst reception indication may be provided by the RLC/MAC layer. The burst reception indication may be indicative of acknowledgment and/or non-acknowledgement of at least one of the data packets of the data burst. The indication of the acknowledgement and/or non-acknowledgement may be provided in any suitable manner. For example, the burst reception indication may comprise an indication of acknowledged data packets that have been successfully received and that there is no need for further transmission. Based on this indication transmission of the successfully received packets may be stopped at the lower layer(s). Alternatively, or additionally, the burst reception indication may comprise an indication of non-acknowledged data packets that have not been successfully received, for example a retransmission request for one or more data packets. The burst reception indication may also indicate successful or unsuccessful reception at burst level. For example, the burst reception indication may indicate whether the entire data burst, for example all packets of the data burst, were successfully received. Based on the burst reception indication, the PDCP layer may determine to request retransmission of the non-acknowledged data packets or data bursts. Based on the burst reception indication, the PDCP layer may further determine to terminate and/or cause termination of the transmission of the data packets which were successfully received. The retransmission request may be provided to the RLC/MAC layer(s), or in general to at least one lower layer of the protocol stack. The PDCP layer may also provide a request to terminate transmission of the acknowledged data packet. An acknowledged data packet may refer to a data packet that has been acknowledged on at least one of the transmission legs. For example, an acknowledgement of one of the duplicated data packets transmitted over the different transmission legs may be considered as an acknowledgement of the data packet.

Figure 6:
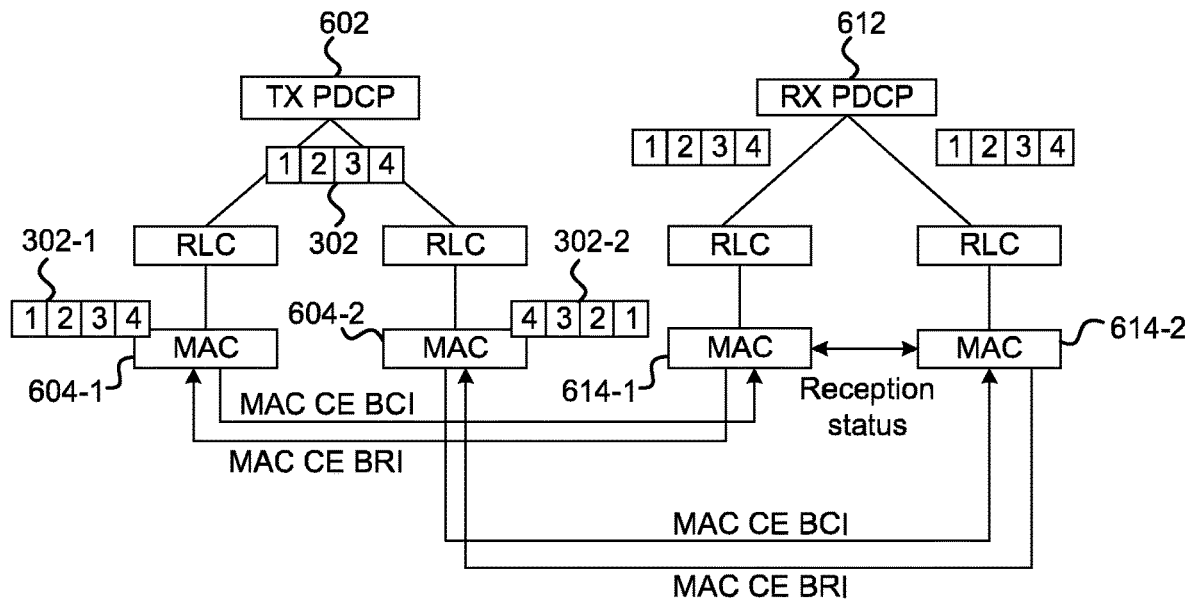
FIG. 6 illustrates an example of burst transmission over two transmission legs with exchange of burst context information over MAC layer, according to an example embodiment.

FIG. 6 illustrates an example of burst transmission over two transmission legs with exchange of burst context information over MAC layer, according to an example embodiment. This example embodiment provides a MAC based implementation form of efficient burst transmission with PDCP duplication. From scheduling point of view, the transmission order of the data packets may be different between the two RLC transmission legs.

The PDCP layer of the transmitter (TX PDCP) 602 may obtain a data burst 302 for transmission. The TX PDCP 602 may for example receive data from the SDAP layer and generate PDCP data packets comprising the received data, for example an SDAP PDU. The TX PDCP 602 may provide the data burst 302 comprising the data packets 1-4 to a first MAC instance 604-1 of the transmitter for transmission on a first RLC leg. The data burst 302 may be also provided to a second MAC instance 604-2 of the transmitter for transmission on a second RLC leg. The data burst 302 may comprise four data packets in a regular packet order of 1-2-3-4. The TX PDCP 602 may provide the data burst 302 in the same transmission order to both MAC instances 604-1, 604-2. As discussed with reference to FIG. 5, the TX PDCP 602 may also provide burst context information to the first and second MAC instances 604-1, 604-2.

The first MAC instance 604-1 may transmit a the data packets 1-4, for example as a first data burst 302-1, on a first RLC leg. The first data burst 302-1 may comprise the data packets 1-4 of the data burst 302 in the same order as received from the TX PDCP 602. However, the second MAC instance 604 may transmit the data packets 1-4 of the data burst 302 in a different transmission order, for example as a second data burst 302-2. The first and second data bursts 302-1, 302-2 may therefore comprise the same data packets 1-4. The first and second data bursts may be also called a first duplicated data burst and a second duplicated data burst, respectively. The transmission order of the data packets 1-4 may be therefore different for the first RLC leg and the second RLC leg. The second MAC instance 604-2 may for example transmit the data packets 1-4 on the second RLC leg in a reverse order (4-3-2-1) compared to the first RLC leg. The TX PDCP 602 may instruct the second MAC instance 604-2 to transmit the second data burst 302-2 in the different order, for example based on a control message provided to the second MAC instance 604-2. The control message may for example comprise instructions to re-order the data packets 1-4, for example to reverse the transmission order. The different transmission order may be obtained for example by using a first-in first-out (FIFO) packet buffer in the first MAC instance 604-1 and a last-in first-out (LIFO) packet buffer in the second MAC instance 604-2. If the inter-arrival time within a burst is negligible, this does not cause any significant latency penalty.

It is noted that the first MAC instance 604-1 may be located at a first device, for example MgNB 120, and the second MAC instance 604-2 may be located at another device, for example SgNB 122. The first device may transmit the first data burst 302-1 and cause transmission of the second data burst 302-2 at the second device, for example by configuring the second device to transmit the second data burst 302-2. Such configuration may comprise an indication of a requested order of transmission for the second MAC instance 604-2. Alternatively, the first and second MAC instances 604-1, 604-2 may be located at a single device, for example UE 110, which may transmit both the first data burst 302-1 and the second data burst 302-2 on the first and second RLC legs, respectively. Therefore, the transmission of the second burst may be caused by transmitting the second burst by the device itself. According to an example embodiment, the burst context information may be transmitted to the receiver at the MAC layer. According to another example embodiment, the burst reception information may be transmitted to the transmitter at the MAC layer.

Figure 7:
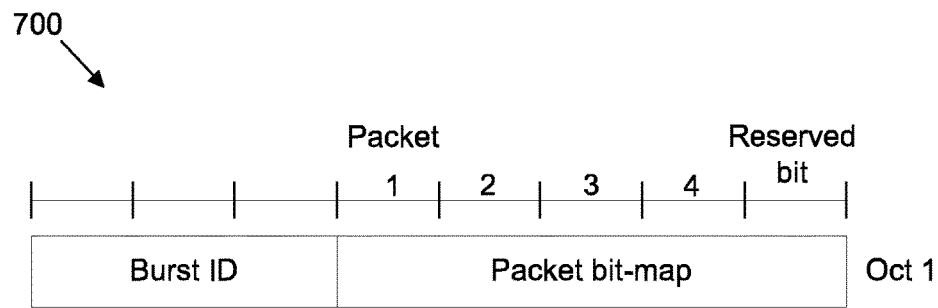
FIG. 7 illustrates an example of a MAC control element comprising a burst identifier and a packet bit-map, according to an example embodiment.

FIG. 7 illustrates an example of a MAC control element comprising a burst identifier and a packet bit-map, according to an example embodiment. The burst control information may be provided for example as one or more of the MAC control elements (CE) 700. The MAC CE 700 may comprise a group of bits, for example at the beginning of the MAC CE 700, to indicate the burst identifier. As illustrated in FIG. 7, the group of bits may comprise for example three bits. The MAC CE 700 may further comprise a packet bit-map and one or more reserved bits. The length of the MAC CE 700 may be eight bits, that is, one octet. The packet bit-map may comprise an indication of upper layer data packets included in a transmission (lower layer data burst). As will be further discussed in relation to FIG. 8, a data burst may be divided into multiple transmissions or bursts at a lower protocol layer. For example, if first two data packets of the data burst are included in a first transmission on a first transmission leg, the packet bit-map of the MAC CE provided on the first transmission leg may comprise bits '1100' indicating that the first two data packets of the data burst are included in the first transmission. If two last data packets of the data burst are included in the first transmission on a second transmission leg, the packet bit-map of the MAC CE provided on the second transmission leg may comprise bits '0011' indicating that the last two data packets are included in the first transmission. Similar MAC CEs may be provided on each transmission leg to indicate data packets carried in subsequent transmission(s).

The MAC layer may deliver the data packets together with the MAC CE 700 to the physical layer for transmission. The MAC CE 700 for the burst context may include at least a burst identifier and a packet identifier for each transport block. The burst context information may therefore comprise a mapping between packet identifier(s) of data packet(s) (1-4) and one or more transport blocks of the MAC layer. Alternatively, or additionally, the burst context information may comprise a mapping between a burst identifier of the data burst 302 and at least one transport block of the MAC layer.

In case of sidelink, the burst context information may be delivered from UE 110 to the sidelink UE 112, or vice versa, using physical layer signaling, for example sidelink control information (SCI). The physical layer signaling may be used instead of the MAC CE 700. The sidelink control information may be transmitted on a physical sidelink control channel (PSCCH). Alternatively, the burst context information may be provided in radio resource control (RRC) signaling.

Referring back to FIG. 6, the first and second MAC instances 604-1, 604-2 of the transmitter may communicate with corresponding first and second MAC instances 614-1, 614-2 of a receiver. Similar to the transmitter, the first and second MAC instances 614-1, 614-2 of the receiver may be located within a single device, such as UE 110, or multiple devices, such as MgNB 120 and SgNB 122. The first MAC instance 614-1 may receive the first data burst 302-1 comprising the plurality of data packets (1-4) of the data burst 302. The first data burst 302-1 may be received over the first RLC leg. The second MAC instance 614-2 may receive the second data burst 302-2 comprising the plurality of data packets 1-4 of the data burst 302 in the different transmission order compared to the transmission order of the data packets for the first RLC leg. The second data burst 302-2 may be received over the second RLC leg. Each of the MAC instances 614-1, 614-2 may decode transport blocks associated with the received data bursts 302-1, 302-2, respectively. The second MAC instance 614-2 may re-order the received data packets.

The first and second MAC instances 614-1, 614-2 may further receive the burst context information, for example as one or more MAC CEs 700 or as part of the physical layer signaling, from the corresponding MAC instances 604-1, 604-2 of the transmitter. Based on the received data packets, optionally with the burst context information, the first and second MAC instances 614-1, 614-2 may determine whether all or a subset of the data packets 1-4 from a data burst were successfully received. The first and second MAC instances 614-1, 614-2 may further generate a reception status for the data burst 302-1 or 302-2 accordingly. The first and second MAC instances 614-1, 614-2 may then exchange their reception statuses. For example, the first MAC instance 614-1 may receive the reception status of the data packets 1-4 from the second MAC instance 614-2. The first MAC instance 614-1 may determine a burst reception indication considering the received data packets (own reception status) and the reception status of the second MAC instance 614-2. The burst reception indication (BRI) for the data burst 302 may be therefore determined based on the received data packets and a reception status of the same packets associated with a second RLC leg. This enables the data packets received over the second RLC leg, for example at another device, to be considered when providing burst reception feedback to the transmitter and hence unnecessary retransmissions may be avoided in case at least some of the packets were successfully decoded. The burst reception indication may be therefore considered as a merged or joint burst reception indication for the two RLC legs. The burst reception indication may be indicative of acknowledgment and/or non-acknowledgement of at least one of the data packets 1-4 of the data burst 302, as discussed above.

The data packets and/or reception statuses of data bursts 302-1, 302-2 may be determined or processed taking into account the different transmission order. For example, the second MAC instance 614-2 may re-order the received data packets such that its reception status corresponds to the transmission order on the first RLC leg. The reception status may for example comprise a sequence of bits indicating successful reception or failed reception for the data packets in the regular transmission order. The second MAC instance 614-2 may similarly determine the burst reception indication based on the re-ordered data packets of the second data burst 302-2 and the reception status of the first data burst 302-1 provided by the first MAC instance 614-1.

The first MAC instance 614-1 of the receiver may transmit the burst reception indication on the first RLC leg to the first MAC instance 604-1 of the transmitter. The second MAC instance 614-2 of the receiver may transmit the burst reception indication on the second RLC leg to the second MAC instance 604-2 of the transmitter. The burst reception indication may be therefore transmitted on the MAC layer.

The first and/or second MAC instances 614-1, 614-2 of the receiver may further provide acknowledged data packet (s) to the RX PDCP 612. The first and/or second MAC instances 614-1, 614-2 may further provide the burst reception indication to the RX PDCP 612.

The first MAC instance 604-1 may receive the burst reception indication from the first MAC instance 614-1 of the receiver. Based on the burst reception indication the first MAC instance 604-1 may determine to retransmit at least one non-acknowledged data packet on the first RLC leg or to stop the transmission of at least one acknowledged data packet on the first RLC leg. Similarly, the second MAC instance 604-1 of the transmitter may perform retransmission of non-acknowledged data packets or stop transmission of acknowledged data packets based on the burst reception indication received from the second MAC instance 614-2 of the receiver. Retransmission of a non-acknowledged data packet may comprise continuing transmission of a duplication of the non-acknowledged data packet on at least one of the first RLC leg and the second RLC leg. The first and/or second MAC instances 604-1, 604-2 may also transmit an indication of stopping the transmission of the acknowledged data packets. The first and/or second MAC instances 614-1, 614-2 may receive the retransmission of the non-acknowledged data packet(s) or the indication of stopping transmission of the acknowledged data packet(s). The reception statuses of the retransmitted data packets may be then exchanged between the first and second MAC instances 614-1, 614-2. A merged or joint burst reception indication may be then provided to MAC instances 604-1, 604-2 of the transmitter and/or the RX PDCP 612. Successfully received data packets of the retransmission may be provided to the RX PDCP 612.

Figure 8:
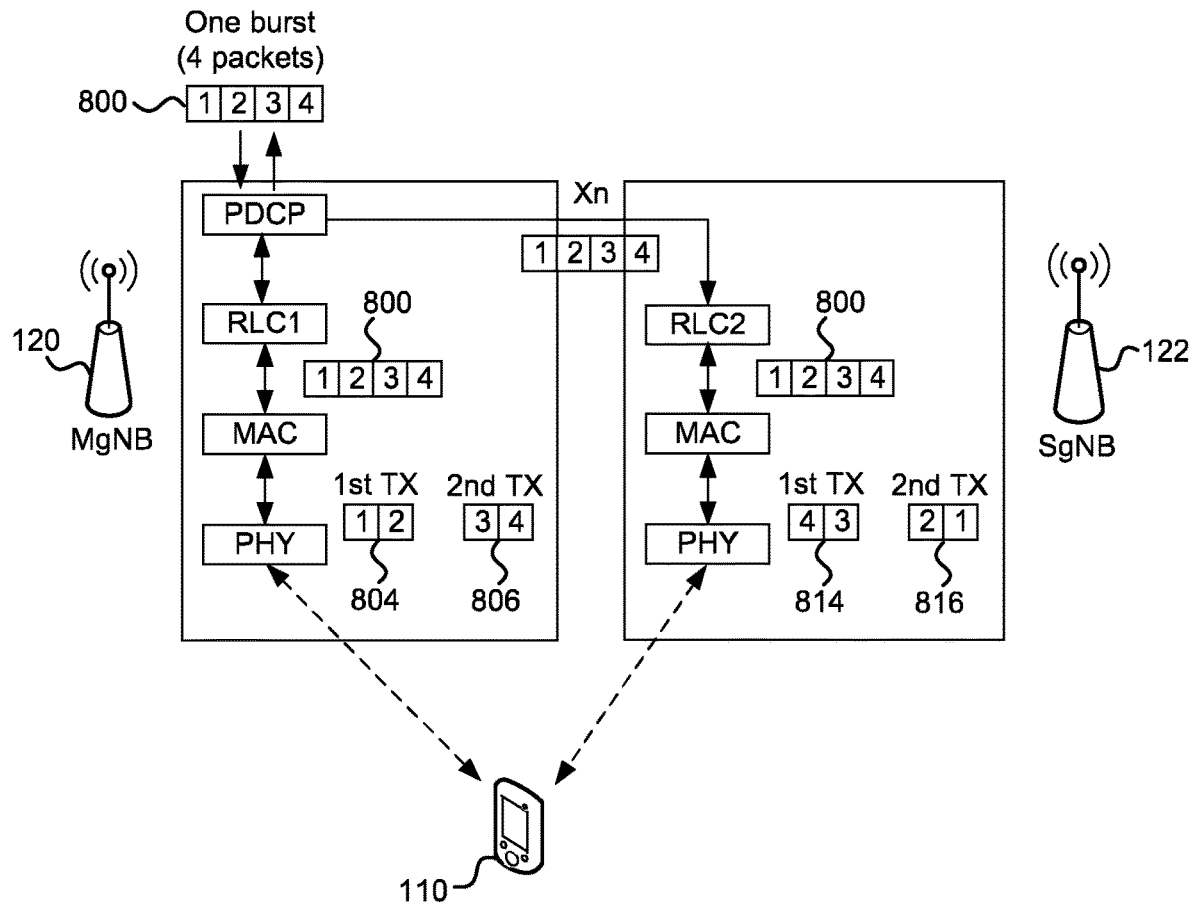
FIG. 8 illustrates an example of burst transmission with data packets of a data burst divided into two transmissions, according to an example embodiment.

FIG. 8 illustrates an example of burst transmission with data packets of a data burst divided into two transmissions, according to an example embodiment. The data burst 800 may be duplicated on two RLC legs (RLC1, RLC2), for example corresponding to MgNB 120 and SgNB 122. The MgNB 120 and SgNB 122 may communicate over the Xn interface. Similar to FIG. 6, the transmission order of the data packets 1-4 may be different on the two RLC legs. Furthermore, the data burst 800 may be divided into first and second transmissions on the first RLC leg. The data burst 800 may be also divided into first and second transmissions on the second RLC leg. The first transmissions on the first and second RLC legs may be transmitted at same or different transmission times. The first and second transmissions on the first and second RLC legs may be considered as individual data bursts, or sub-bursts, on the physical layer.

Therefore, a transmitter such as for example MgNB 120, may transmit a first subset (1,2) of the data packets 1-4 of the data burst 800, for example in a first transmission 804, on the first RLC leg. The transmitter may further cause transmission of a second subset (4,3) of the data packets of the data burst 800, for example in a first transmission 814, on the second RLC leg. The PDCP layer of MgNB 120 may instruct the MAC layer of the SgNB 122 to re-order the data burst and divide it into the two transmissions. In general, burst context information provided to a lower layer of the protocol stack 402 may comprise an indication of a transmission order of data packets. The burst context information may further comprise an indication of a number of transmissions (number of PHY layer bursts) for transmitting the data burst. The burst context information may further comprise an indication of a time interval between the transmissions, for example a sub-burst periodicity. The transmitter may further transmit the second subset (3,4) of the data packets, for example in a second transmission 806, on the first RLC leg. The transmitter may further cause transmission the first subset (2,1) of the data packets, for example in a second transmission 816, on the second RLC leg.

The first transmission 204 at the first RLC leg may be transmitted at a first transmission time, which may be same or different compared to a transmission time of the first transmission 814 at the second RLC leg. The second transmission 806 at the first RLC leg may be transmitted at a second (subsequent) transmission time, which may be same or different compared to a transmission time of the second transmission 816 at the second RLC leg. A transmission time may refer for example to a start time of transmission of the first data packet of the first or second transmission of the divided data burst or to a time interval consumed for transmitting the first or second transmission of the divided data burst. There may be a time interval between the first and second transmissions, for example to ensure sufficient time for processing the first transmission at the relevant MAC instance of UE 110 in order to transmit the burst reception indication as feedback to the MgNB 120 and/or the SgNB 122.

At the receiver side, a first MAC instance may receive the first data burst 804 comprising the first subset (1,2) of the data packets of the data burst 800 over the first RLC leg in the first transmission. A second MAC instance may receive the second data burst 814 comprising the second subset (4,3) of the data packets on the second RLC leg in the first transmission. The first MAC instance and the second MAC instance may be located at UE 110 (or sidelink UE 112). Alternatively, the first and second (RX) MAC instances may be located at different devices. For example, in uplink transmission the receiver MAC instances may be located at MgNB 120 and SgNB 122.

The first MAC instance and/or the second MAC instance of the receiver may determine to transmit a burst reception indication for the data burst 800. However, prior to transmission of the burst reception indication the MAC instances may exchange the reception statuses, as discussed above. Reception status of the first MAC instance may indicate successful reception of data packets 1 and 2. Reception status of the second MAC instance may indicate successful reception of data packets 4 and 3. Hence, the first and second MAC instances may generate a burst reception indication indicating successful reception of all data packets 1-4 of the data burst 800.

In response to receiving the burst reception indication, the MAC instances of the transmitter may determine to refrain from transmitting the remaining data packets 3,4 and 2,1 scheduled for the second transmissions. However, if the burst reception indication indicates non-acknowledgement of at least one data packet, for example as a retransmission request, the MAC instances may retransmit the non-acknowledged data packets. Retransmission of a non-acknowledged data packet may comprise continuing transmission of a duplication of the non-acknowledged data packet on at least one of the first RLC leg and the second RLC leg. The MAC instances may for example transmit the data packets scheduled for the second transmissions at each MAC instance, or, the MAC instances may transmit the non-acknowledged data packets scheduled for the second transmissions and not transmit the acknowledged data packets scheduled for the second transmissions.

As discussed above, the first and second MAC instances, either at the transmitter or the receiver, may be located at different devices. Therefore, a receiver device may receive at least one of data bursts 804, 806 and receive a reception status of at least one of data bursts 814, 816 from another device. However, in case of sidelink communication, for example between the UE 110 and the sidelink UE 112, a transmitter device may transmit at least one of data bursts 804, 806 on a first sidelink carrier. The transmitter device may further transmit at least one of the data bursts 814, 816 on a second sidelink carrier. The receiver device may receive at least one of the data bursts 804, 806 on the first sidelink carrier. The receiver device may further receive at least one of the data bursts 814, 816 on the second sidelink carrier.

The MAC layer based burst handling functionality with division of the upper layer data burst into multiple lower layer transmissions may be applied depending on specific deployment scenarios and also QoS requirements of the upper layer data burst. Dividing the data burst 800 into a plurality of transmissions enables for example to avoid unnecessary retransmissions and it may be applied for example when the delay between the different transmissions is acceptable. Even though some example embodiments have been described using RLC legs as an example, it is appreciated that the example embodiments may be applied to any type of transmission legs.

Figure 9:
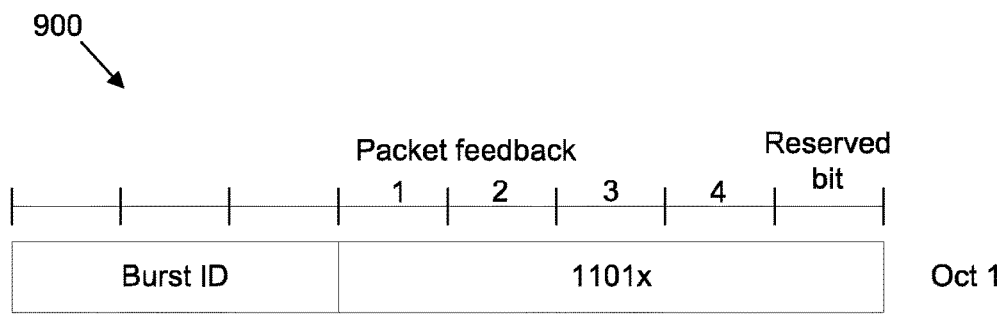
FIG. 9 illustrates an example of a MAC control element comprising a burst identifier and data packet feedback information, according to an example embodiment.

FIG. 9 illustrates an example of a MAC control element comprising a burst identifier and packet feedback information, according to an example embodiment. The MAC CE 900 may be used to transmit the burst reception indication. For example, based on the decoding outcome, the UE 110 may transmit the burst reception indication to both MgNB 120 and SgNB 122 with the feedback information covering the data packets of the data burst. In the example of FIG. 9 it is assumed that data packets 1, 2, and 4 have been received correctly, but data packet 3 cannot be acknowledged. The packet feedback field of the MAC CE 900 may comprise a binary indication of acknowledgement and non-acknowledgement for data packets associated with the burst identifier field of the MAC CE 900. The packet feedback bits may be allocated in the regular transmission order. For example, the bit sequence "1101" may indicate that the third data packet is not acknowledged, while the other data packets are acknowledged. The MAC CE 900, or in general the burst reception indication, may further comprise an indication of a data radio bearer identifier (DRB ID). The DRB ID may be used to handle situations where burst traffic is provided on more than one data radio bearer. Alternatively, or additionally a logical channel identifier (LCID) may be included in the burst reception indication, for example the MAC CE 900. The MAC CE 900 may further comprise one or more reserved bits. The length of the MAC CE 900 may be one octet.

Figure 10:
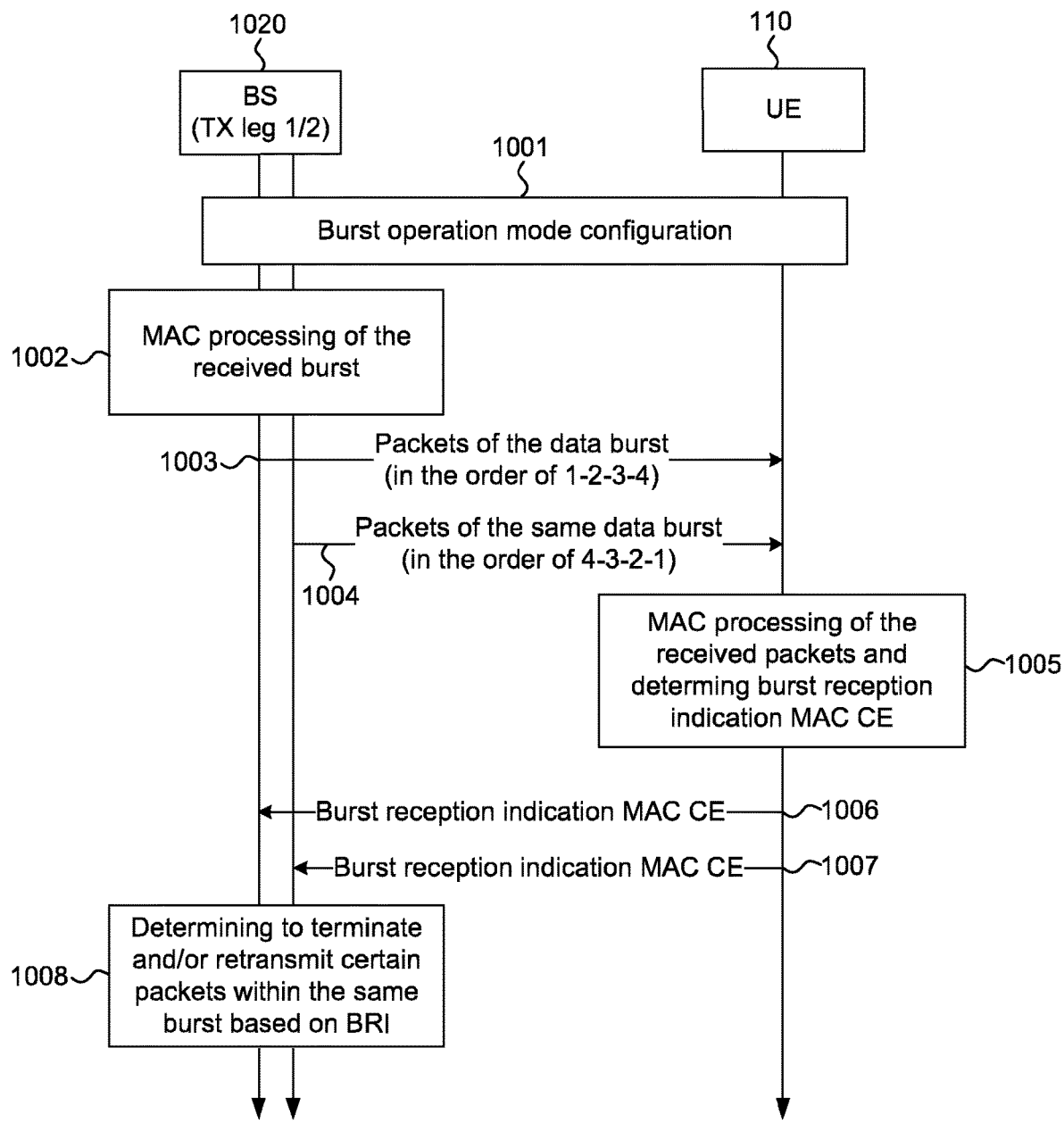
FIG. 10 illustrates an example of signaling between a UE and a base station for downlink PDCP duplication with burst transmission, according to an example embodiment.

FIG. 10 illustrates an example of signaling between a UE and a base station (BS) for downlink PDCP duplication with burst transmission, according to an example embodiment. The base station 1020 may be configured to operate first and second transmission legs (TX leg 1/2). It is understood that even if base station 1020 is described to perform certain function, it may be internally performed at certain layer of the protocol stack, for example the PDCP, RLC, or MAC layer, as described above. Functionality of base station 1020 may be also divided between different network nodes, for example a master node such as MgNB 120 and a secondary node such as SgNB 122.

At operation 1001, the UE 110 and the base station 1020 may perform burst operation mode configuration. For example, the UE 110 and base station 1020 may exchange configuration information comprising information on burst transmission parameters such as for example an indication of a transmission order for each transmission leg.

At operation 1002, the base station 1020 may perform MAC processing of a data burst received for transmission. For example, the base station 1020 may construct transport blocks comprising the data packets of the data burst. A MAC CE including the burst context information may be also generated.

At operation 1003, the base station 1020 may transmit the packets of the data burst in the regular order, for example in the order of 1-2-3-4, on the first transmission leg. The base station 1020 may further transmit the burst context information on the first transmission leg, for example in the MAC CE generated at operation 1002. The UE 110 may receive the data packets and/or the burst context information.

At operation 1004, the base station 1020 may transmit the packets of the same data burst in a different transmission order, for example in the reverse order of 4-3-2-1, on the second transmission leg. The base station 1020 may further transmit the burst context information on the second transmission leg, for example in the MAC CE generated at operation 1002. The UE 110 may receive the data packets and/or the burst context information.

At operation 1005, the UE 110 may perform MAC processing of the received data packets. For example, the UE 110 may decode the transport blocks associated with the data burst or the data packets of the data burst. The UE 110 may further determine the burst reception indication. The UE 110 may include the burst reception indication in a MAC CE.

At operation 1006, the UE 110 may transmit the burst reception indication on the first transmission leg, for example in the MAC CE generated at operation 1005.

At operation 1007, the UE 110 may transmit the burst reception indication on the second transmission leg, for example in the MAC CE generated at operation 1005. Even though the UE 110 is illustrated to transmit the burst reception indication over both transmission legs, it is possible that the UE 110 generates one burst reception indication by merging reception statuses of data bursts received over both legs and transmits the burst reception indication on one of the transmission legs. This reduces required transmission capacity and also the power consumption at UE 110.

At operation 1008, the base station 1020 may determine to terminate transmission of and/or retransmit certain data packets within the same data burst based on the burst reception indication(s). The base station 102 may cause termination of a transmission of a duplication of acknowledged data packet(s) on the first transmission leg or the second transmission leg. For example, the base station 1020 may terminate, at the first transmission leg, transmission of a data packet that is a duplication of a data packet acknowledged at the second transmission leg. Similarly, base station 1020 may cause termination of transmission of a data packet at the second transmission leg, of the data packet is a duplication of a data packet acknowledged at the first transmission leg. For example, a master node may instruct a secondary node to terminate transmission of a data packet at a second transmission leg, if an acknowledgement of a duplication of the data packet was received at the master node over the first transmission leg.

Figure 11:
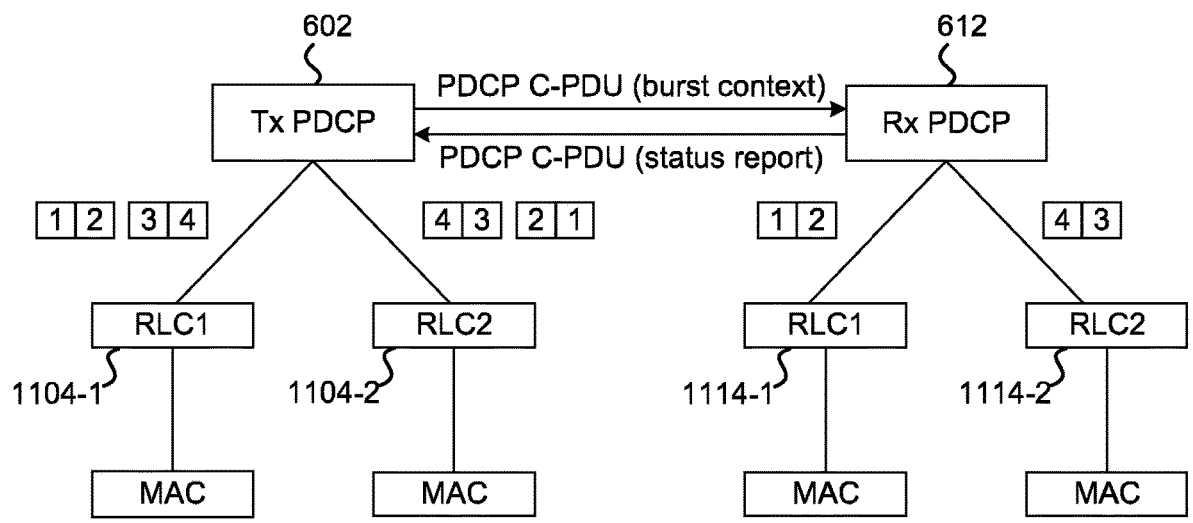
FIG. 11 illustrates an example of downlink burst transmission over two transmission legs with exchange of burst context information over PDCP layer, according to an example embodiment.

FIG. 11 illustrates an example of burst transmission over two transmission legs with exchange of burst context information over PDCP layer, according to an example embodiment. This example embodiment provides a PDCP based implementation form of efficient burst transmission with PDCP duplication. While the MAC based implementation form may enable lower latency and provide more flexibility, the PDCP based implementation form may be more compatible with existing standards.

The TX PDCP 602 may obtain a data burst for transmission. The data burst may comprise data packets 1-4. The burst context information and burst reception indication may be exchanged at the PDCP layer between the transmitter and the receiver. The transmitter may transmit the burst context information to the receiver, for example in a PDCP C-PDU (control PDU).

The TX PDCP 602 may determine the transmission order for the different RLC legs, for example 1-2-3-4 (cf. FIFO) for the first RLC leg and 4-3-2-1 (cf. LIFO) for the second RLC leg. The TX PDCP 602 may provide the data packets to a first RLC instance 1104-1 for transmission on the first RLC leg as a first data burst. The TX PDCP 602 may further re-order the data packets and provide the re-ordered data packets to a second RLC instance 1104-2 for transmission on the second RLC leg as a second data burst. The TX PDCP 602 may therefore determine the data packets of a data burst and submit them to different RLC legs in different orders. The two data bursts may be transmitted by corresponding MAC instances to the receiver. At the receiver side, the received data bursts may be processed by corresponding MAC/RLC instances. It is noted that no modifications are needed to the RLC and MAC instances, since the burst transmission functionality, for example re-ordering the data packets for the second RLC leg, is performed at the PDCP layer.

The TX PDCP 602 may further determine to divide the data packets of the data burst into different transmissions. The TX PDCP 602 may therefore determine a number of packets to be delivered in the first transmission, for example all four packets or a subset of two data packets. For example, the TX PDCP 602 may divide the received data burst comprising data packets 1-4 into a first transmission comprising a first subset of data packets 1,2 and a second transmission comprising a second subset of data packets 3,4 for transmission on the first RLC leg. Similarly, the TX PDCP 602 may divide the re-ordered data burst into a first transmission comprising the (re-ordered) second subset of data packets 4,3 and a second transmission comprising the (re-ordered) first subset of data packets 2,1 for transmission on the second RLC leg.

At the receiver side, a first RLC instance 1114-1 may provide the data packets received over the first transmission leg to the RX PDCP 612. A second RLC instance 1114-2 may provide the data packets received over the second transmission leg to the RX PDCP 612. The RX PDCP 612 may therefore receive the first data burst and the second data burst over the first and second RLC legs, respectively. It is noted that the different RLC instances 1114-1 and 1114-2 of the receiver may be located at different devices. The same applies to the corresponding MAC instances. Therefore, since the PDCP based operation does not require modifications or signaling to the RLC/MAC layer, additional signaling between devices, for example over the Xn interface may be avoided.

The RX PDCP 612 may determine the burst reception indication based on the data packets received over the first RLC leg and a reception status of the data packets received over the second RLC leg. In the MAC based implementation form, the reception status for the second RLC leg was received from another MAC instance. Now, in the PDCP based implementation for the RX PDCP 612 may determine the reception status for the data packets received over the second RLC leg itself. Naturally, the reception status may be determined for the data packets received over the first transmission leg as well. Based on the information about reception of data packets over both RLC legs, the RX PDCP 612 may determine the burst reception indication such that it takes into account data packets successfully received either over the first or second RLC leg or both. The RX PDCP 612 may transmit the burst reception indication (status report) on the PDCP layer, for example in a PDCP C-PDU. The burst reception indication may be triggered to be transmitted to the TX PDCP 602 for example if the whole burst is received.

In the example of FIG. 11, the RX PDCP 612 receives correctly received data packets 1,2 from the first RLC instance 1114-1 and correctly received data packets 4,3 from the second RLC instance 1114-2. In response to receiving all four data packets, the RX PDCP 612 may transmit a burst reception indication comprising acknowledgement for the four data packets or a collective acknowledgement for the data burst. Alternatively, or additionally, the RLC instance(s) of the transmitter may poll and receive the ACK/NACK feedback. The RLC instance(s) may relay the ACK/NACK feedback, or, in general the burst reception indication(s) to the TX PDCP 602. The TX PDCP 602 may then determine that no retransmission is needed. The TX PDCP 602, or in general an upper layer of the protocol stack, may determine not to retransmit the at least one acknowledged data packet. The TX PDCP 602 may further instruct the lower layer(s) (e.g. MAC) to stop the transmission of the data packets of the data burst. For example, the TX PDCP 602 may indicate discard of a data packet acknowledged by one RLC instance to another RLC instance, or refrain from submitting the data packet to the other RLC instance.

RLC AM (acknowledged mode) may be used for providing in-sequence delivery. However, RLC AM may not be optimal for URLLC or other extreme real-time services due to excessive delay for some applications. If RLC AM is used in such scenario, it should be considered how often the RLC transmitter may need to poll the receiver in order to allow the transmitter to determine on burst-delivery as the earliest time possible. Use of RLC AM may in general cause more overhead and degrade reliability, compared to the one-off PDCP level indication of the burst context from the transmitter and reporting the burst reception indication from the receiver. Duplication may be applied for these PDCP C-PDUs for reliability. However, as a possible option based on enhancing RLC AM, the receiver side may be provided with the burst context information and configured to put up received PDUs belonging to the data burst to the PDCP layer even out of order and with new trigger(s) to send RLC ACK to the transmitter, for example every N PDUs of the burst received. Integer N may be a function of the burst size, for example the number of data packets of the data burst.

If the RX PDCP 612 does not receive all data packets of the data burst, the burst reception indication may indicate non-acknowledgement of certain data packets, for example data packet 3 as illustrated in FIG. 9. Therefore, in response to receiving the burst reception indication, the TX PDCP 602 may determine to retransmit at least one non-acknowledged data packet on the first RLC leg and/or the second RLC leg. Retransmission of a non-acknowledged data packet may comprise continuing transmission of a duplication of the non-acknowledged data packet on at least one of the first RLC leg and the second RLC leg. The TX PDCP 602 may further determine to stop transmission of the acknowledged data packet(s). The TX PDCP 602 may provide the non-acknowledged data packets to the first and/or second RLC instances 1104-1, 1104-2 for retransmission on the first and/or second transmission legs. The RX PDCP 612 may receive the retransmission of the non-acknowledged data packet(s) over the first RLC leg or the second RLC leg.

As disclosed herein, different types of burst transmission and burst reception feedback, for example the MAC CE based or PDCP C-PDU based approaches, may be applied. It is however possible to operate the burst transmission in a flexible way, for example applying MAC CE based burst reception indication to the PDCP based implementation form. In this case, the MAC layer may be informed about the burst context and its reception status.

Figure 12:
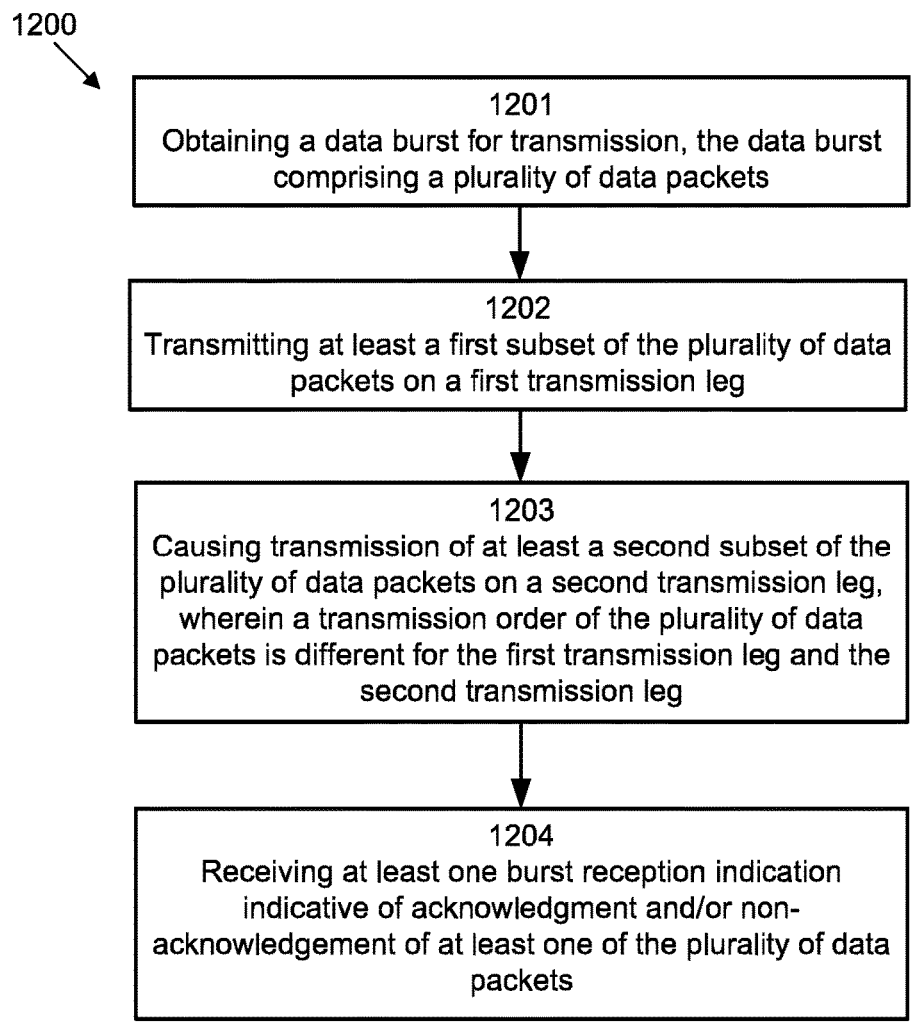
FIG. 12 illustrates an example of a method for burst transmission of duplicated data packets, according to an example embodiment.

FIG. 12 illustrates an example of a method 1200 for burst transmission of duplicated data packets, according to an example embodiment.

At 1201, the method may comprise obtaining a data burst for transmission, the data burst comprising a plurality of data packets.

At 1202, the method may comprise transmitting at least a first subset of the plurality of data packets on a first transmission leg.

At 1203, the method may comprise causing transmission of at least a second subset of the plurality of data packets on a second transmission leg. A transmission order of the plurality of data packets may be different for the first transmission leg and the second transmission leg.

At 1204, the method may comprise receiving at least one burst reception indication indicative of acknowledgment and/or non-acknowledgement of at least one of the plurality of data packets.

Figure 13:
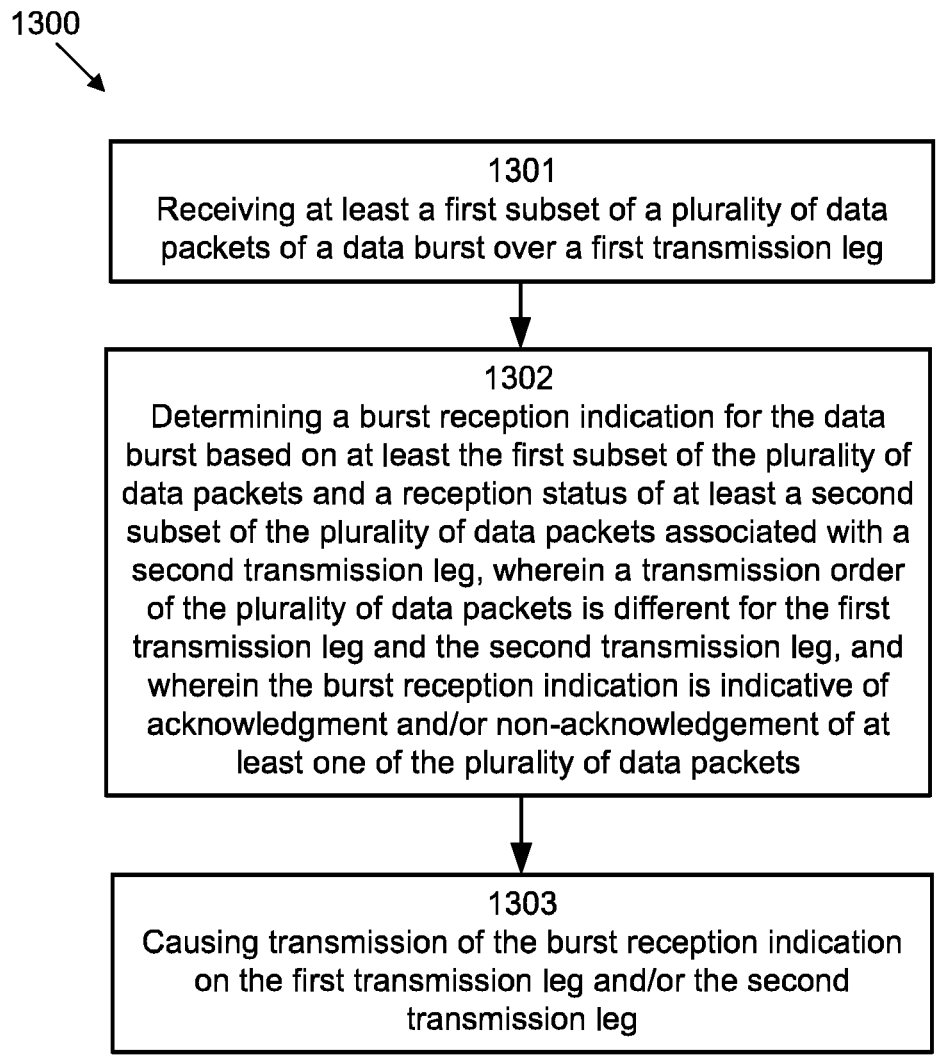
FIG. 13 illustrates an example of a method for reception of duplicated data packets with burst transmission, according to an example embodiment.

FIG. 13 illustrates an example of a method 1300 for reception of duplicated data packets with burst transmission, according to an example embodiment.

At 1301, the method may comprise receiving at least a first subset of a plurality of data packets of a data burst over a first transmission leg.

At 1302, the method may comprise determining a burst reception indication for the data burst based on at least the first subset of the plurality of data packets and a reception status of at least a second subset of the plurality of data packets associated with a second transmission leg. A transmission order of the plurality of data packets may be different for the first transmission leg and the second transmission leg. The burst reception indication may be indicative of acknowledgment and/or non-acknowledgement of at least one of the plurality of data packets.

At 1303, the method may comprise causing transmission of the burst reception indication on the first transmission leg and/or the second transmission leg.

Further features of the methods directly result from the functionalities and parameters of the MgNB 120, SgNB 122, gNB 130, UE 110, and/or sidelink UE 112, as described in the appended claims and throughout the specification, and are therefore not repeated here. Different variations of the methods may be also applied, as described in connection with the various example embodiments.

An apparatus, for example a client node such as a UE 110 or sidelink UE 112, or a network node such as MgNB 120 or SgNB 122 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one memory including computer code;
the at least one memory and the computer code configured to, with the at least one processor, cause the apparatus at least to:
receive at least a first subset of a plurality of data packets of a data burst over a first transmission leg;
determine a burst reception indication for the data burst based on at least the first subset of the plurality of data packets and a reception status of at least a second subset of the plurality of data packets associated with a second transmission leg, wherein a transmission order of the plurality of data packets is different for the first transmission leg and the second transmission leg, and wherein the burst reception indication is indicative of acknowledgment and/or non-acknowledgement of at least one of the plurality of data packets; and
cause transmission of the burst reception indication on the first transmission leg and/or the second transmission leg; and
wherein the at least one memory and the computer code are further configured to, with the at least one processor, cause the apparatus to:
receive the first subset of data packets at a first instance of a lower layer of a protocol stack;
receive the reception status of at least the second subset of the plurality of data packets from a second instance of the lower layer of the protocol stack; and
transmit the burst reception indication at the lower layer of the protocol stack.

2. The apparatus according to claim 1, wherein the at least one memory and the computer code are further configured to, with the at least one processor, cause the apparatus to:
receive the first subset of data packets and the second subset of data packets at an upper layer of a protocol stack;
determine the burst reception indication based on the first subset of the plurality of data packets and the second subset of the plurality of data packets; and
transmit the burst reception indication at the upper protocol layer of the protocol stack.

3. The apparatus according to claim 2, wherein the at least one memory and the computer code are further configured to, with the at least one processor, cause the apparatus to:
receive burst context information at the upper layer of the protocol stack.

4. The apparatus according to claim 3, wherein the burst context information comprises at least one of:
an indication of a number of the plurality of data packets in the data burst,
an indication of a sequence number of at least one of the plurality of data packets in the data burst,
a burst arrival time, or
a packet delay budget.

5. The apparatus according to claim 2, wherein the upper layer of the protocol stack comprises a packet data convergence protocol layer, and/or wherein the lower layer of the protocol stack comprises a medium access control layer or a radio link control layer.

6. The apparatus according to claim 5, wherein the at least one memory and the computer code are further configured to, with the at least one processor, cause the apparatus to:

receive the burst context information in at least one of: a control element of the medium access control layer, control signaling of the packet data convergence protocol, radio resource control signaling, physical layer signaling, or sidelink control information.

7. The apparatus according claim 1, wherein the at least one memory and the computer code are further configured to, with the at least one processor, cause the apparatus to:
receive burst context information at the first instance of the lower layer of the protocol stack.

8. The apparatus according to claim 7, wherein the burst context information comprises at least one of:
a mapping between a burst identifier of the data burst and at least one transport block of the lower layer of the protocol stack, or
a mapping between a packet identifier of at least one of the plurality of data packets and the at least one transport block of the lower layer of the protocol stack.

9. The apparatus according to claim 1, wherein the at least one memory and the computer code are further configured to, with the at least one processor, cause the apparatus to:
receive the first subset of the plurality of data packets in a first transmission over the first transmission leg; and
receive the second subset of the plurality of data packets in a second transmission over the first transmission leg, wherein the second subset of the plurality of data packets is received in a first transmission over the second transmission leg and wherein the first subset of the plurality of data packets is received in a second transmission over the second transmission leg.

10. The apparatus according to claim 1, wherein the at least one memory and the computer code are further configured to, with the at least one processor, cause the apparatus to:
receive the plurality of data packets over the first transmission leg in a reverse order compared to the transmission order of the plurality of data packets for the second transmission leg.

11. The apparatus according to claim 1, wherein the apparatus comprises a master node configured to:
receive the first subset of data packets; and
receive the reception status of at least the second subset of data packets from a secondary node.

12. The apparatus according to claim 1, wherein the apparatus comprises a client node configured to:
receive the first subset of data packets on a first sidelink carrier; and
receive the second subset of data packets on a second sidelink carrier.

* * * * *